United States Patent Office 3,236,657
Patented Feb. 22, 1966

3,236,657
PECTIN PRODUCT AND PROCESS

Raymond E. Cox, Los Angeles, Calif., assignor to General Foods Corporation, White Plains, N.Y., a corporation of Delaware No Drawing. Filed Nov. 9, 1961, Ser. No. 151,152
11 Claims. (Cl. 99—132)

This invention relates to pectic substances and more particularly to a physical mixture which includes pectin and has novel and advantageous characteristics.

The terms, pectin or pectins, designate those water-soluble pectinic acids of varying methyl ester content and degree of neutralization which are capable of forming gels with sugar and acid under suitable conditions. More precisely, pectinic acids is a term used to designate colloidal polygalacturonic acids which contain more than a negligible proportion of methyl ester groups. Pectinic acids, if suitably low in methoxyl content, are also capable of forming gels with certain metallic ions. The salts of pectinic acids are either normal or acid pectinates.

A typical characteristics of pectin is its ability to form the well-known pectin-sugar-acid jelly. While pectin has other uses, such as its ability to form emulsions for pharmaceutical preparations, and its efficacy as a stabilizer and thickener, e.g., in such confectionaries as gum drops, the major use of pectin is in jellies. When marketed for use in the preparation of jellies, pectin is advantageously sold in powdered form. Pectin may most economically be marketed in a solid form rather than in a liquid, colloidal sol, because more pectin per se is present in each shipped pound of pectinic material and also because a container for powder is generally less expensive than one required to hold a liquid. Consequently, it has long been a problem in the pectin business to provide pectin in a solid, easily transportable form which will meet the requirements of the trade.

Many difficulties are encountered in shipping pectin in powdered form. Pectin should advantageously have a moisture content of about 6 to 12%, say 8%, so that it will reach an equilibrium with its surroundings and will not lump in storage, as it will at high moisture contents. Pectin must be reasonably pure; if it carries large quantities of fruit sugars, for example, a mass will be formed which has been described as being similar in appearance to a rubber bath sponge (see Rooker, Fruit Pectin, p. 18, Avi Publishing Co., Inc., 1921). The powderous pectin-acid-sodium bicarbonate mixture presently in commercial use also tends to form agglomerates. Having become agglomerated into lumps, it is almost impossible under ordinary conditions to disperse the lumped pectin in a sugary, aqueous medium to form a dispersion which, upon cooling, will yield a clear, even-textured jelly. Lumps of pectin are extremely difficult to break up, the pectin forming the equivalent of a shell around the center of the lump and keeping that pectin at the center of the lump dry regardless of ordinary degrees of stirring and agitation applied to the pectin to put it into dispersion.

Vegetable pectin, such as fruit pectin derived from lemons, oranges and apples, is highly acid when obtained in its final, substantially pure form after having been extracted from the vegetable source. Pectin from lemon peels, for example, is generally in the range of 2.8 to 2.9 pH after it is obtained in a substantially pure form. Yet at such low pH values powdered pectin, on being stored, shows a marked and rapid loss of jelly grade, jelly grade being a standardized measure of the quantity of pectin required to gel a predetermined amount of sugar. Loss of jelly grade means an economic loss to the manufacturer of pectin and a disadvantage to the user of the pectin, who will have to increase the amount of pectin he adds to sugar, water and acid in order to gel the mixture after heating and cooling. Loss of jelly grade, is therefore, a highly undesirable phenomenon which must be avoided by the pectin manufacturer. At excessively high pH's, i.e., those above about pH 4.25 in a 1% sol, pectin also tends to lose its jelly grade during storage.

A corollary to the problem of preventing the lumping or clumping of pectin in storage is the problem of preventing similar agglomeration and the formation of hard, gelatinous shells about lumps of pectin when the pectin is attempted to be dispersed in an aqueous medium. The problem has long been recognized as being acute. Several methods have been suggested for insuring adequate pectin dispersion in an aqueous medium, and the most prominent of such methods have been delineated in the book, The Pectic Substances, by C. I. Kertesz, p. 188, Interscience Publishers, Inc., 1951.

One of the solutions to the problem of dispersing pectin or pectinic acid in water is to add a small quantity of ethanol or glycerol to the solid pectin prior to dispersion. It is obvious, however, that problems with governmental agencies may be encountered when ethanol or glycerol is added to pectin which is to be used in a food product. In addition, it is undesirable to market the pectin in a form which includes a liquid; it is likewise disadvantageous to market with the pectin a material which does not play any real part in the subsequent production of a jelly from the pectin.

Another method of promoting the dispersibility of powdered pectin in water has been to mix a small quantity of dry sugar or other water-soluble substance with the pectin and then add the mixture to an aqueous medium with thorough stirring. While the amount of sugar added to the pectin may be small when compared with the amount of sugar which is actually employed when a jelly is subsequently prepared, the amount of sugar is still large enough to add considerably to the weight of pectin transported. If the proper amount of sugar to insure adequate dispersion of pectin is packaged with the pectin by the manufacturer, it will thus be apparent that a large quantity of sugar will be shipped in commerce at a relatively high cost. If a lesser quantity of sugar is included with the pectin, the commercial user will have the burden of adding sugar to the powderous pectin. This is a task which the commercial user rightfully does not wish to assume.

Still another method of promoting dispersibility is to plate the pectin particles with aluminum or higher fatty acids and their derivatives. The use of aluminum is undesirable in a food product and, additionally, the aluminum will interfere with other uses of pectins, such as in pharmaceuticals. Higher fatty acids and their derivatives tend to accumulate beneath the pectin particles and to make the pectin float when mixed with an aqueous medium.

Still another method of enabling pectin to be adequately dispersed in an aqueous medium is the incorporation with the powdered pectin of an organic acid, such as citric or tartaric acid, in addition to an inorganic carbonate. The reaction of the organic acid with the inorganic carbonate liberates carbon dioxide, which effervesces through the dispersion of pectin and tends to agitate the pectin and so adequately disperse it throughout the aqueous medium. This method, however, suffers from the disadvantage that the organic acid must be shipped with the pectin mixture and actually is not directly used in the jelly subsequently produced from the pectin. Further, there is a strong likelihood that there will be some reaction between the acid and the carbonate during their storage in an intimate mixture. Such a reaction reduces the subsequent effervescene when the mixture is added to an aqueous medium and also causes granulation or agglomeration. None of the methods of insuring dispersibility of pectin in an aqueous medium, therefore, has been found to be completely satisfactory when considered from the point of view of proper pectin dispersion, economic considerations, suitability in all uses of pectin, and stability during periods of prolonged storage.

It is, therefore, a primary object of the present invention to provide a pectinic mixture which is readily dispersible in an aqueous medium and also exhibits improved storage stability in that the pectin in the mixture is maintained within a pH range at which it will not degrade rapidly in storage.

It is another object of the present invention to provide a pectinic mixture in which the pectin thereof is readily dispersible in an aqueous medium and every component of which performs a function in the preparation of jelly in addition to assisting in the dispersion of the pectin.

It is another object of the present invention to provide a pectinic mixture in which the pectin thereof is readily dispersible in an aqueous medium but between the components of which there is no substantial reaction prior to contact with the aqueous medium.

It is still another object of the present invention to provide a dry, pectinic mixture which may be shipped through ordinary channels of commerce in containers which do not give a high degree of protection to the contents thereof but in which the pectin in the mixture will be maintained at a safe pH range so that there is little if any loss of jelly grade.

It is a further object of the present invention to provide a pectinic mixture in which the pectin thereof may be dispersed in an aqueous medium with a minimum of agitation and which, therefore, is particularly adapted to be retailed directly to the ultimate consumer who will prepare jelly from the pectinic mixture.

The present invention is based on the discovery that dry, powdered pectin at a pH in the range of about 3.35 to 3.50 can be commingled with a minor portion of an inorganic carbonate, preferably sodium bicarbonate, in such proportions that when the mixture is later dispersed in an aqueous medium, the pH of a subsequently formed 4% sol of 150 grade will be about 4.10 to 4.25. Another ingredient preferably found in the mixture is dextrose, which is a stable article of commerce and which is used to space pectin particles from each other so that, in theory, each particle of pectin can come into direct contact with a particle of carbonate. The invention takes the form of a process for preparing a pectin mixture which does not lose jelly grade and is readily dispersible in water, and also the mixture, itself.

In performing the process of the invention, pectin is first prepared in any of several standard ways from vegetable materials, preferably fruit such as lemons. As so obtained, pectin is in the form of a powder or dispersed in a fluid with a pH of about 2.8 to 2.9. It is an important part of the present invention that the pectin in such a highly acid state first be partially neutralized so that the pH thereof is increased to about 3.35 to about 3.50. After such partial neutralization, the pectin is dried, preferably under a vacuum, to a low moisture, for example, to about 5 to 8% moisture. Partial neutralization of the pectin at a pH of 2.8 to 2.9 may be accomplished by any of the variety of means, such as by the addition of ammonia, ammonium bicarbonate, sodium carbonate or sodium bicarbonate to a sol of the pectin. Sodium hydroxide is a less preferred partial neutralization agent because of the danger of local over-concentrations of alkali.

After having been dried, the pectin is then ground, such as in a hammer mill, into a finely divided form. By finely divided is ordinarily meant to a size at which a 100% will pass at 60 or 80-mesh screen.

The process of my invention will be further illustrated by the following, specific example.

*Example I*

A precipitate of pectin obtained by extraction from lemon peels was pressed to a moisture content of 11% solids. To an aliquot of 100 lbs. of the pectin was added 5 lbs. of sodium carbonate. Prior to the addition of the carbonate the pH of the pectin was 2.84; the carbonate brought the pH up to 3.38 after agitation. The partially neutralized pectin was then vacuum dried in a steam-jacketed cylinder with agitation under 27 inches of vacuum. After drying, it had a moisture content of 6%. The dried pectin was ground in a hammer mill until 100% passed an 80-mesh screen.

The product of my invention, in which the partially neutralized pectin is made readily dispersible in water, is composed of the partially neutralized pectin to which has been added a minor portion of an inorganic carbonate, which term is intended to include bicarbonates. The carbonate in powdered form is commingled with the finely divided pectin. The subsequent dispersion of the pectin has been found to be superior when an inorganic carbonate, alone, is used with the pectin rather than when an organic acid, such as citric or tartaric acid, is also used. Since pectin, itself, is highly acid, it has been found that utilization of the acidity of the pectin to react with the carbonate or carbonates results in liberation of carbon dioxide directly on the pectin particles. Such liberation applies more effective effervescent agitation to the pectin and distributes pectin particles more uniformly throughout the medium. Further, it appears that fines of pectin, i.e., pectin particles which will pass a 200-mesh screen and which tend to agglomerate more readily than larger pectin particles, do not tend to agglomerate as easily when a carbonate without an organic acid is used in conjunction with pectin. Pectin fines are formed when dry pectin is ground to pass 60 or 80-mesh. The present invention therefore, contemplates the use of inorganic carbonate without an organic acid to liberate the carbon dioxide of the carbonate.

Sodium bicarbonate is preferred as the carbon dioxide-supplying agent to be employed with the pectin. Since it is not as strongly basic as sodium carbonate, the reaction between the pectin and bicarbonate can be more easily controlled and localized overalkalization will not occur as readily.

The invention will be better understood by reference to the following, specific examples of typical pectin formulations according to my invention:

*Example II*

| | Lbs. |
|---|---|
| Slow-set pectin (ground to pass 80-mesh) at a pH of 3.48 in 1% sol | 60 |
| Powdered USP sodium bicarbonate | 2.76 |
| | 62.76 |

*Example III*

| | Lbs. |
|---|---|
| Slow-set pectin (ground to pass 80-mesh) at a pH of 3.48 in a 1% sol | 64 |
| Powdered USP sodium bicarbonate | 3.14 |
| Hydrate dextrose (Cerelose brand passing 35-mesh) | 34.0 |
| | 101.14 |

*Example IV*

| | Lbs. |
|---|---|
| Rapid-set pectin (ground to pass 80-mesh) at a pH of 3.44 in 1% sol | 55.0 |
| Powdered USP sodium bicarbonate | 2.11 |
| Hydrate dextrose (Cerelose brand passing 35-mesh) | 43.5 |
| | 100.61 |

When the pectinic mixtures of Examples II, III and IV were dispersed in a 4% aqueous sol of 150 grade, the pH's of the sols were 4.20, 4.20 and 4.15, respectively. The precise quantities of pectin, bicarbonate and hydrate dextrose will vary in accordance with many factors, among which are the desired pH of the resulting pectin solution and the jelly grade desired in the pectin mixture. Since a grade of 150 as defined by the Institute of Food Technologists has become more or less standard, that is the jelly grade which the pectin manufacturer will normally try to achieve. Rapid and slow-set pectin can be used. The difference in degrees of set of pectin is a function of the degree of methylation of the pectin molecule. Generally, slow-set pectin has been methylated to about 60 to 62% of the free carboxyl groups of the pectin, while rapid-set pectin has about 73% of its free carboxyl groups methylated. Medium-set pectin is methylated to an intermediate degree.

Dextrose, or corn sugar, should be used in such an amount as will materially assist in spacing the pectin particles so that they can be contacted by the inorganic carbonate and to achieve a desired jelly grade. Other compositions which are useful in spacing particles of pectin may be used in place of dextrose, but dextrose has been found advantageous in use because it also acts as a sweetening agent when the pectin mixture is to be utilized to form a jelly for food use. Of course, additional sugar must be added when a jelly is to be formed. Hydrated dextrose is used in the above examples because it is a stable article of commerce and is readily available.

It should be noted that each of the ingredients which is used in a typical pectinic mixture according to the present invention is active in forming a subsequent food jelly in addition to its function of aiding the dispersibility of the pectin in an aqueous medium. The pectin, of course, gels a sugar-acid solution. The sodium bicarbonate or other carbonate brings the pH of the pectin up to a range of about 4.10 to 4.25. The sugar functions as a sweetening agent as well as a filler.

While a satisfactory pH range of about 3.35 to 4.25 has been found satisfactory in a 4% sol of the pectinic mixture of this invention, the viscosity of the liquid pectin decreases as the pH thereof increases. As it has been found preferable by consumers that viscosities be as low as possible, the pH of the pectinic mixture should be as high as possible within a range within which jelly grade is not impaired. Consequently, the carbonate not only serves to form carbon dioxide to disperse pectin particles throughout the medium, but also raises the pH of the pectin in solution to form a sol of the highest practical pH. Since the dextrose serves to sweeten the subsequently formed jelly as well as to space pectin particles apart, a pectin mixture according to the present invention has the economic advantage of having a shipping weight as low as possible. In addition, the mixture provides pectin which has long storage life on the shelf and in trade channels and can be dispersed in an aqueous medium to form a pectin sol having low viscosity in the safe pH range.

It will be apparent that such alterations and modifications in the description of the present invention as would be obvious to one skilled in this art can be made without departing from the scope of the invention. The purview of my invention is, therefore, deemed to include such obvious alterations and modifications and is to be limited only by the scope of the following, appended claims.

What is claimed is:

1. A process for preparing a dry pectinic mixture readily dispersible in an aqueous medium, which comprises commingling a major portion of pectin in finely divided form and having a pH of about 3.35 to 3.50 in a 1% sol with a minor portion of a salt selected from the group consisting of alkali metal carbonates and bicarbonates, the ratio of pectin to salt being such that when the mixture is dispersed in an aqueous medium to form a 4% sol, the pH of said sol will be about 4.10 to 4.25.

2. A process as claimed in claim 1, in which said pectin has a pH of about 3.4 in a 1% sol and said mixture has a pH of about 4.15 in a 4% sol.

3. A process for preparing a dry pectinic mixture readily dispersible in an aqueous medium, which comprises partially neutralizing pectin to bring the pH thereof to about 3.35 to 3.50 in a 1% sol drying the partially neutralized pectin, commingling a major portion of said pectin in finely divided form with a minor portion of a salt selected from the group consisting of alkali metal carbonates and bicarbonates, the ratio of pectin to salt being such that when the mixture is dispersed in an aqueous medium to form a 4% sol, the pH of said sol will be about 4.10 to 4.25.

4. A process for preparing a dry pectinic mixture readily dispersible in an aqueous medum, which comprises preparing from a vegetable source a pectin having a pH of about 2.2 to 2.9, partially neutralizing the pectin to bring the pH thereof to about 3.35 to 3.50 in a 1% sol, drying the partially neutralized pectin, and commingling a major portion of the partially neutralized pectin in finely divided form with a minor portion of a salt selected from the group consisting of alkali metal carbonates and bicarbonates, the ratio of pectin to salt being such that when the mixture is dispersed in an aqueous medium to form a 4% sol, the pH of said sol will be about 4.10 to 4.25.

5. A process for preparing a dry pectinic mixture readily dispersible in an aqueous medium, which comprises preparing from a vegetable source a pectin having a pH of about 2.8 to 2.9, partially neutralizing the pectin to bring the pH thereof to about 3.35 to 3.50 in a 1% sol, drying the partially neutralized pectin, subdividing the pectin to a particle size whereat 100% will pass a 60-mesh screen, and commingling a major portion of the partially neutralized pectin in finely divided form with a minor portion of a salt selected from the group consisting of alkali metal carbonates and bicarbonates, the ratio of pectin to salt being such that when the mixture is dispersed in an aqueous medium to form a 4% sol, the pH of said sol will be about 4.10 to 4.25.

6. A process for preparing a dry pectinic mixture readily dispersible in an aqueous medium, which comprises preparing from a vegetable source a pectin sol having a pH of about 2.8 to 2.9, partially neutralizing the pectin by adding to the sol a basic substance selected from the group consisting of ammonia, ammonium bicarbonate, sodium carbonate and sodium bicarbonate to bring the pH thereof to about 3.35 to 3.50 in a 1% sol, vacuum drying the partially neutralized pectin, subdividing the pectin to a particle size whereat 100% will pass an 80-mesh screen, and commingling a major portion of the pectin with a minor portion of sodium bicarbonate, the ratio of pectin to bicarbonate being such that when the mixture is dispersed in an aqueous medium to form a 4% sol, the pH of said sol will be about 4.10 to 4.25.

7. A dry pectinic mixture readily dispersible in an aqueous medium, comprising a major portion of finely divided pectin having a pH of about 3.35 to 3.50 in a 1% sol and commingled therewith a minor portion of a salt selected from the group consisting of alkali metal carbonates and bicarbonates, the relative proportions of the pectin and salt being such that when the mixture is dispersed in an aqueous medium to form a 4% sol, the pH of the sol will be about 4.10 to 4.25.

8. A dry pectinic mixture as claimed in claim 7, said mixture further comprising a quantity of sugar greater than that of said salt commingled with said salt and said pectin.

9. A dry pectinic mixture readily dispersible in an aqueous medium, comprising a major portion of pectin ground to pass a 60-mesh screen and having a pH of about 3.4 in a 1% sol, and a minor portion of sodium bicarbonate intimately commingled with said pectin, the ratio of pectin to bicarbonate being such that when the mixture is dispersed in an aqueous medium to form a 4% sol, the pH of the sol will be about 4.10 to 4.20.

10. A dry pectinic mixture as claimed in claim 9, said mixture further comprising a quantity of dextrose less than the quantity of said pectin but greater than the quantity of said bicarbonate.

11. A dry pectinic mixture as claimed in claim 10, in which said dextrose has been ground to pass a 35-mesh screen.

References Cited by the Examiner

UNITED STATES PATENTS 1,611,528 12/1926 Jameson ------------- 99—132
2,503,258 4/1950 Graham et al. ------ 99—132 X

FOREIGN PATENTS 445,481 4/1936 Great Britain.

OTHER REFERENCES

Kertesz: "The Pectic Substances," 1951, pp. 471–2, Interscience Publishers, Inc., New York.

A. LOUIS MONACELL, *Primary Examiner*.